United States Patent
Tanis et al.

(10) Patent No.: US 6,296,566 B1
(45) Date of Patent: Oct. 2, 2001

(54) INFEED IMPELLER FOR A ROTARY COMBINE

(75) Inventors: Dale R. Tanis, Geneseo; Robert A. Matousek, Milan; Jon E. Ricketts; Glenn E. Pope, both of Viola, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/412,468

(22) Filed: Oct. 5, 1999

(51) Int. Cl.$^7$ .................................................. A01F 12/00
(52) U.S. Cl. ............................................. 460/70; 460/68
(58) Field of Search ....................... 460/68, 70; 198/660, 198/661, 676

(56) References Cited

U.S. PATENT DOCUMENTS

| | | |
|---|---|---|
| 511,393 | 12/1893 | Wrigley . |
| 2,507,245 | * 5/1950 | Dady .................... 110/286 |
| 2,655,890 | 10/1953 | Whipple . |
| 2,985,952 | 5/1961 | Nutter et al. . |
| 3,534,742 | * 10/1970 | Knapp ................... 460/68 |
| 3,586,004 | * 6/1971 | De Pauw ................ 460/68 |
| 3,685,638 | 8/1972 | Siwersson et al. . |
| 4,148,323 | * 4/1979 | McMillen et al. ........ 460/70 |
| 4,159,023 | 6/1979 | Todd et al. . |
| 4,170,235 | 10/1979 | Ashton et al. . |
| 4,192,322 | 3/1980 | Wilson . |
| 4,250,896 | 2/1981 | Wagstaff et al. . |
| 4,306,572 | 12/1981 | Campbell et al. . |
| 4,362,168 | 12/1982 | Hengen et al. . |
| 4,733,672 | 3/1988 | Tophinke . |
| 4,891,876 | 1/1990 | Freeman . |
| 4,936,810 | 6/1990 | Strong et al. . |
| 5,145,462 | 9/1992 | Tanis et al. . |
| 5,158,433 | 10/1992 | Cleary . |
| 5,257,959 | 11/1993 | Tanis . |
| 5,364,306 | 11/1994 | Soots et al. . |
| 5,387,153 | 2/1995 | Tanis . |
| 6,036,598 | * 3/2000 | Harden et al. ........... 460/70 |
| 6,050,894 | * 4/2000 | Johnson ................. 460/68 |
| 6,083,102 | * 7/2000 | Pfeiffer et al. ......... 460/68 |

* cited by examiner

*Primary Examiner*—Thomas B. Will
*Assistant Examiner*—Nathan Mammen
(74) *Attorney, Agent, or Firm*—Richard G. Lione; Brinks Hofer Gilson & Lione

(57) ABSTRACT

An infeed assembly for a rotary combine has an impeller for directing crop materials outwardly and rearwardly. The impeller is arranged on the infeed section of the rotor and includes impeller blades that redirect the incoming mat-like crop materials into a whirling, circulatory motion and also translates the crop materials rearward towards the rotor's threshing section. Each blade has a leading edge that is swept back in two dimensions. Each leading edge is simultaneously swept back circumferentially away from the direction of impeller rotation and axially towards the rotor's threshing section. The pitch of each blade increases for a predetermined distance rearwardly.

5 Claims, 6 Drawing Sheets

INFEED IMPELLER FOR A ROTARY COMBINE

FIELD OF THE INVENTION

The present invention relates generally to agricultural combines. It relates particularly to rotary combines and, more particularly, to the rotor assembly.

BACKGROUND OF THE INVENTION

A well-known form of harvesting machine is a rotary combine. A typical combine includes a crop harvesting apparatus which reaps grain stalks and feeds the grain stalks to a separating or threshing apparatus. The grain stalks or other crop materials harvested in the field are moved rearwardly from a crop harvesting header assembly and introduced for threshing to the rotor assembly by a crop feeder assembly.

In a rotary combine, the rotor assembly includes a generally tubular rotor housing mounted in the combine body. A driven rotor is coaxially mounted within the housing. The rotor comprises an infeed section and a cylindrical threshing section, and is supported at opposite ends by front and rear bearing assemblies.

The cylindrical threshing section of the rotor and the rotor housing mount cooperating threshing elements which separate grain from other material in a threshing zone. The crop material is threshed as it spirals around the rotor threshing section and passes through openings in the rotor housing.

As discussed in Tanis U.S. Pat. No. 5,387,153, assigned to the same assignee as the present invention, the ability to transfer crop materials from the feeder assembly to the threshing zone of the rotor assembly is a key to efficient combine operations. Most rotary combine rotors include an infeed section impeller comprised of a series of impeller blades arranged at a forward end of the rotor. The impeller blades rotate within a shroud which is a part of the rotor housing. During harvesting operations, the generally linear movement of the crop materials received from the feeder assembly is converted by the rotating impeller blades into a rotating, circulatory movement, in a rearward and outward direction.

When rotary combines are used on certain long-stemmed leguminous or grassy crops, such as windrowed perennial or annual rye grass, clover, and bent grass, there is a potential for portions of such grassy crops to extend into the impeller blades while other portions remain partially engaged with the feeder assembly. The latter portions tend to move toward the axis of rotation of the rotor assembly, and may wrap about the front rotor bearing.

Long-stemmed leguminous or grassy crops also have a tendency to wrap around or "hairpin" about the leading edge of the impeller blades. This hairpinning action can create a buildup of crop materials on the aforementioned leading edge, which reduces the effectiveness of the impeller and further reduces combine efficiency.

Numerous impeller designs, including that disclosed in the Tanis patent, have been proposed to prevent crop materials from becoming entangled with the front rotor bearing and prevent hairpinning about the impeller blades' leading edges. None has been thoroughly successful in doing so, however. Furthermore, these designs suffer from the complexity associated with assembly from a multitude of individual parts, and the higher costs associated therewith.

SUMMARY OF THE INVENTION

Accordingly, it is an object of the invention to provide an improved infeed section impeller for a rotary combine.

It is another object to provide an impeller which directs crop material flow outwardly from the impeller axis in a more effective manner.

It is still another object to provide an impeller, including blades, which is cast in one piece.

The foregoing and other objects are realized in an infeed impeller which comprises a plurality of impeller blades cast in one piece with a frustoconical impeller body. The impeller blades impart a rotating, circulatory motion to the mat-like crop which flows in from the feeder assembly. Each impeller blade has a leading edge that engages the crop material as it enters from the feeder assembly. This engagement is the first contact between the crop material and the rotating impeller. According to the invention, each leading edge is swept back as it extends outwardly, and circumferentially, away from the impeller body. In addition, according to the invention, the pitch of each impeller blade, or flight as it is sometimes called, varies from front to back along the impeller body. The pitch increases for a predetermined distance along the impeller body and then remains constant for the remainder of the impeller body length.

The aforedescribed impeller blade leading edge configuration is created by generating a leading edge trace profile wherein any inner diameter is forward of any outer diameter on that edge. In addition, the leading edge has varying pitch because the blade is formed with an increasing pitch for a predetermined distance rearwardly of the front of the impeller. The pitch starts at 400 mm/rev. and increases to 900 mm/rev., just short of midway along the impeller.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
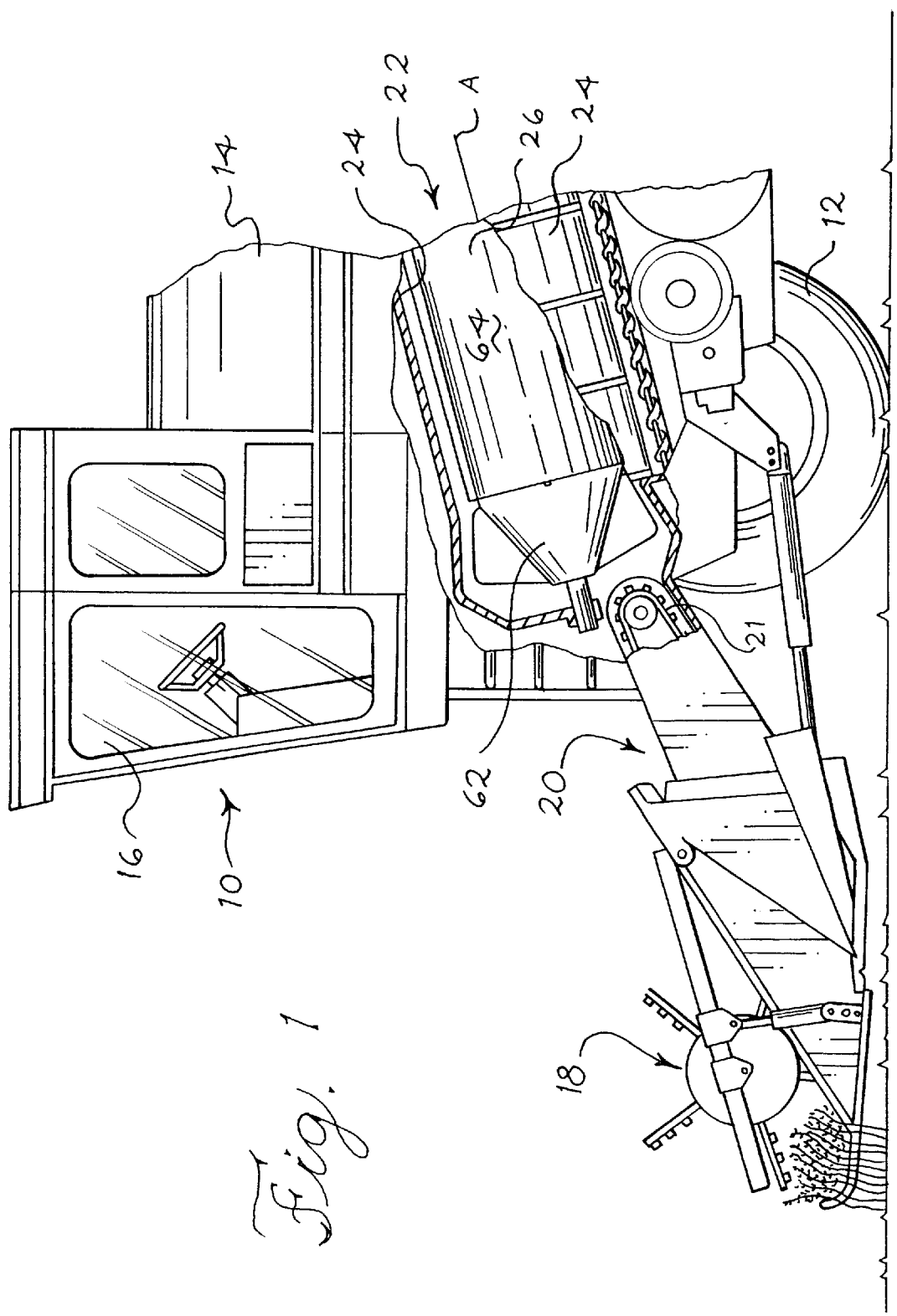
FIG. 1 is a side elevational view of a portion of a rotary combine, showing in partial section a crop feeder assembly, a rotor assembly and a rotor including an infeed section with an impeller embodying features of the invention.

Referring now to the drawings, and particularly to FIG. 1, a self-propelled rotary combine is seen generally at 10. The combine 10 includes a body 14 supported by front wheels 12 (the rear wheels are not shown). The combine 10 also includes an operator's cab 16.

The combine 10 is powered by an engine (not shown), suitably supported within the body 14. The transfer of power from the engine to various driven components of the combine is effected conventionally.

The combine 10 is provided with a crop harvesting header assembly 18 for cutting and gathering crop materials. The header assembly 18 cuts and directs crop materials into a crop feeder assembly 20, including a conveyor 21. The conveyor 21 carries crop materials in a layer or mat toward a rotor assembly 22, which threshes the grain from materials other than grain.

The rotor assembly 22 is supported in a conventional manner inside the body 14. The rotor assembly 22 includes a tubular rotor housing 24 mounted in a fore-and-aft direction in the body 14. A rotor 26 is mounted coaxially within the rotor housing 24, for rotation on the axis A.

Figure 2:
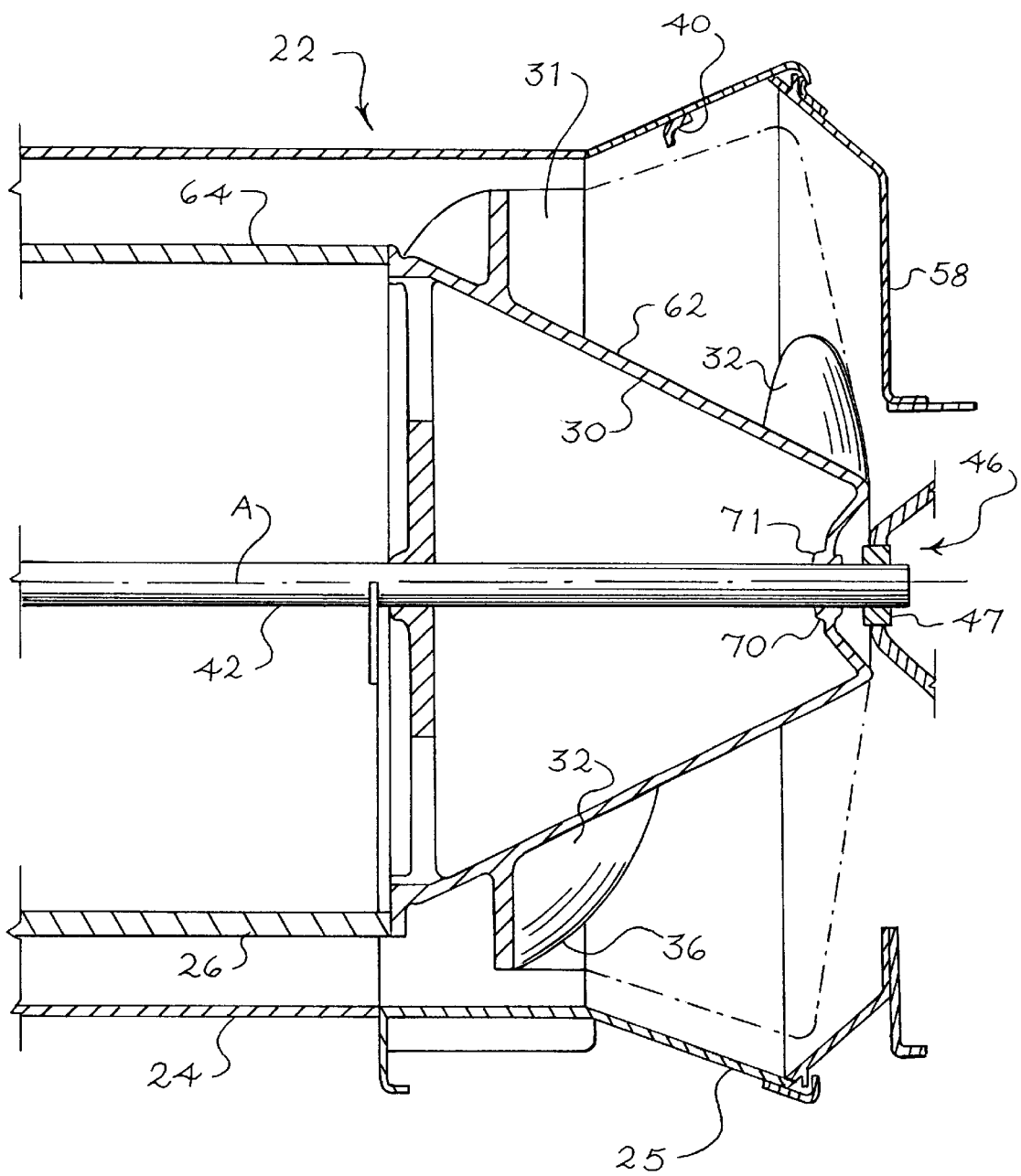
FIG. 2 is an enlarged sectional view of the impeller seen in FIG. 1.

Referring also to FIG. 2, the rotor 26 is a hollow drum rigidly affixed to a shaft 42 extending coaxially through it. The rotor 26 includes an infeed section 62 and a threshing section 64. The infeed section 62 comprises an impeller 30 including an impeller body 31 and two impeller blades 32 extending outwardly therefrom.

At its forward end, the rotor housing 24 includes a transition shroud 25 around the infeed section 62. The transition shroud 25 encloses the impeller 30. The front end 57 of the shroud is closed by a panel 58 over its upper half, and open at 59 over its lower half, for crop materials to enter.

The impeller 30 preferably includes two identical impeller blades 32 which are equally spaced from each other around, and extend radially outwardly from, the impeller body 31. The impeller 30 may comprise more than two blades 32 without departing from the spirit of the present invention, however.

Figure 3:
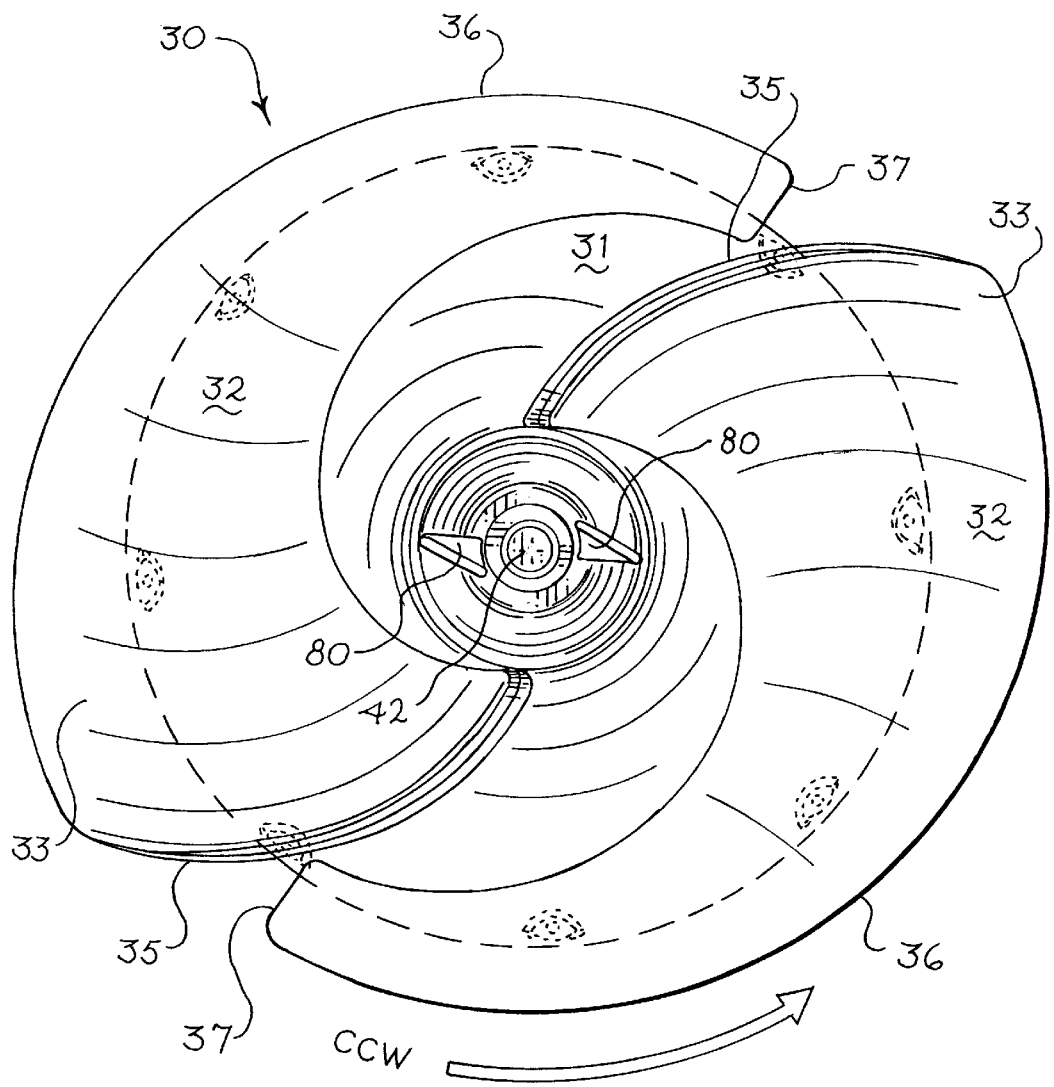
FIG. 3 is a front elevational view of the impeller as seen in FIGS. 1 and 2, with parts removed.
Figure 4:
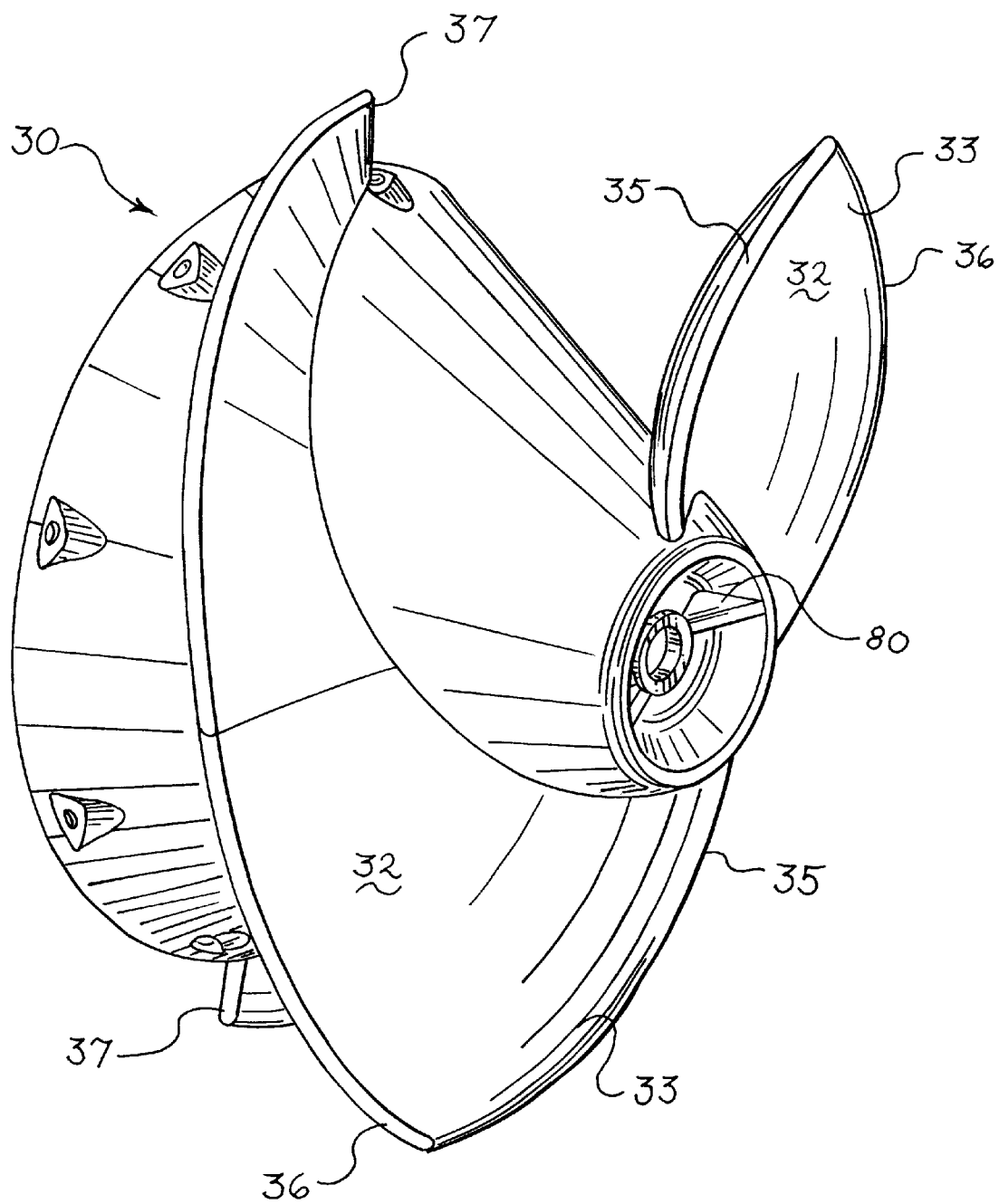
FIG. 4 is perspective view of the impeller embodying features of the invention.
Figure 5:
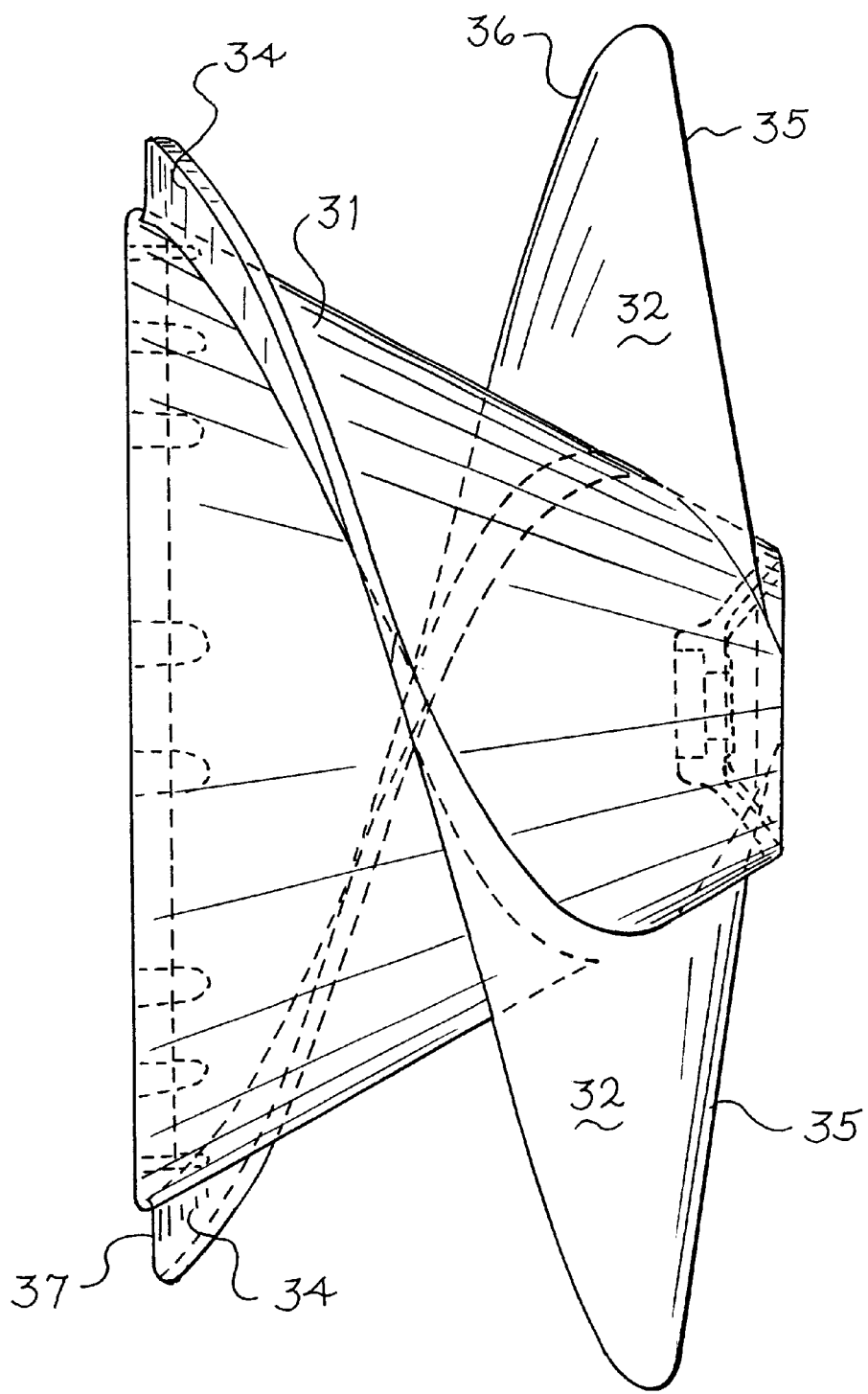
FIG. 5 is a side elevational view of the impeller.

Referring now also to FIGS. 3–5, each impeller blade 32 has a front face 33, a back face 34, a leading edge 35, an outer edge 36 and a trailing edge 37. The trace generated by the outer edges 36 of the two impeller blades 32 during rotation of the impeller 30 approximates the frustum of a cone having a cone angle which is substantially equal to that of the adjacent transition shroud 25. Accordingly, a narrow, annular space is defined between the outer edges 36 of the impeller blades 32 and the inner surface of the adjacent shroud 25, as seen in FIG. 2. Crop material moves rearwardly toward the threshing section 64 through this space during operation, assisted by a plurality of spiral transport vanes 40 mounted inside the transition shroud 25.

As previously pointed out, the rotor drum 26 is fixed to the shaft 42, which supports the rotor 26 for rotation with the shaft on the axis A. The shaft 42 is rotatably supported in the combine body 14 at its front end in a conventional bearing assembly 46. The bearing assembly 46 includes a suitable bearing 47 in which the front end of the shaft 42 is journalled.

The impeller body 30 is frustoconical in shape, as previously pointed out. At its smaller front end, a cup-shaped front wall 70 is fixed to the shaft 42 on a collar 71. Extending outwardly from the collar 71, in the wall 70, are a pair of anti-winding vanes 80.

As discussed in the aforementioned Tanis patent, anti-winding vanes 80 are used to protect the bearing 47 from debris and other foreign material drawn toward it during operation of the rotor assembly 22. As the anti-winding vanes 80 rotate with the rotor 26, they cooperate with vanes (not shown) on the bearing assembly 46 to force debris radially outward away from the axis A of the rotor.

According to the present invention, each impeller blade leading edge 35 is swept back in two dimensions from the point near the forward end of the impeller body 31 where the blade 32 originates. The edge 35 is swept back circumferentially relative to the direction of rotor rotation, i.e., each point on an edge 35 leads, in rotation, every other point farther from the axis of rotation A that is on the same leading edge. The leading edge 35 is also swept back axially so that each point on the edge 35 which is further from the axis A is disposed rearwardly of every point closer to the axis on the edge.

In the embodiment illustrated, the swept back profile of the leading edge 35 originates at a point on the frustoconical impeller body 30 where the body is 238 mm in outside diameter. The leading edge is swept back 97 mm along the axis A of the impeller body 30 to where it meets the outer edge 36 of the blade 32.

Figure 6:
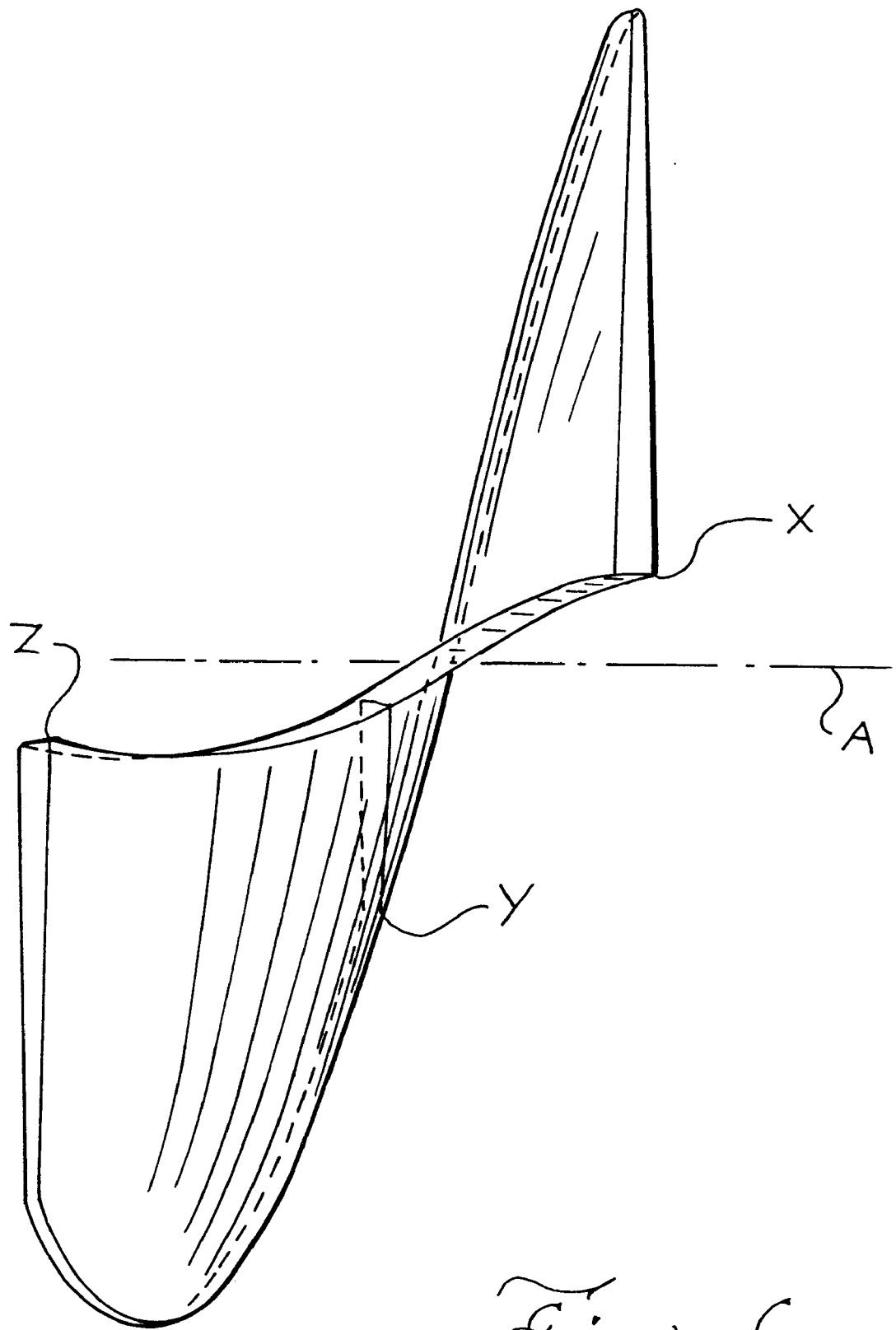
FIG. 6 is a graphic illustration of the blade pitch along the length of the impeller.

In the embodiment illustrated, the impeller body is 469.9 mm in length from its front face, where the leading edge 35 of each blade 32 starts, to its back face where the trailing edge 37 of each blade terminates. Referring now to FIG. 6, between these points (X and Z), the pitch of each blade varies according to the invention.

FIG. 6 illustrates a hypothetical blade without a swept back front edge, in order to better explain blade pitch variations embodied in the invention. Each blade begins its helical path rearwardly from point X at a pitch of 400 mm/rev. For the first 200 mm rearwardly along the axis A, the pitch increases uniformly until at point Y, it is 940 mm/rev. This pitch is then maintained for the remaining 269.9 mm of the impeller body.

During operation, incoming crop materials from the feeder assembly 20 engage the rotating impeller blades 32 and are directed outwardly and rearwardly along the swept back leading edges 35, away from the rotor shaft 42. This action prevents crop materials from becoming entangled around the forward end of the shaft 42, and thereby prolongs the useful life of the bearing 48. Additionally, the swept back leading edge 35 prevents crop materials from hairpinning around the leading edge, which would lead to an inefficient buildup of crop materials about the leading edge.

At the same time, the progressively increasing pitch of the impeller blades or flights 32 moves crop materials rearwardly at a faster and faster pace for the first 200 m of axial travel. This also serves to reduce the danger of crop entanglement and hairpinning.

According to the invention the impeller body 30 and impeller 31 are preferably cast in one piece. The one piece, cast construction is less expensive than a multiple piece assembly. Additionally, a one piece impeller body 31 and blades 32 has a more smooth, unbroken surface, without crevasses between impeller elements that are associated with multiple piece assemblies, and which could entrap crop materials.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. In a rotary combine having a threshing assembly which includes a rotor housing and a rotor arranged for rotation within said rotor housing, said rotor comprising a threshing section and an infeed section, the improvement wherein:
   a) said infeed section comprises a frustoconical impeller body having at least one impeller blade extending outwardly from said body;
   b) said blade having a leading edge that is simultaneously swept back circumferentially relative to the direction of rotor rotation and axially from a forward end of said rotor;
   c) said blade having an outer edge and a trailing edge in addition to said leading edge;
   d) said blade defining a substantially helical path around said body;

e) the pitch of said blade increasing a constant rate from the forwardmost point on said leading edge to an intermediate point on said outer edge;

f) said pitch increase being from about 400 m/rev. to about 940 mm/rev. between said points.

2. In a rotary combine having a threshing assembly which includes a rotor housing and a rotor arranged for rotation within said rotor housing, said rotor comprising a threshing section and an infeed section, the improvement wherein:

a) said infeed section comprises a frustoconical impeller body having at least one impeller blade extending outwardly from said body;

b) said blade having a leading edge that is simultaneously swept back circumferentially relative to the direction of rotor rotation and axially from a forward end of said rotor;

c) said blade having an outer edge and a trailing edge in addition to said leading edge;

d) said blade defining a substantially helical path around said body;

e) the pitch of said blade increasing at a constant rate from the forwardmost point on said leading edge to an intermediate point on said outer edge;

f) said intermediate point being about 200 mm rearwardly of said forwardmost point.

3. The improvement in a rotary combine of claim 2 further characterized in that:

a) said impeller blade is more than 400 mm long measured axially of said impeller body;

b) said pitch remaining substantially constant between said intermediate point and said trailing edge.

4. In a rotary combine having a threshing assembly which includes a rotor housing and a rotor arranged for rotation within said housing, said rotor comprising a threshing section and an infeed section, the improvement wherein said infeed section comprises:

a) a frustoconical impeller body adapted to rotate on the axis of the frustum;

b) first and second impeller blades extending radially outwardly from said body;

c) each of said blades including a leading edge adjacent the front end of said impeller body extending outwardly and rearwardly of the impeller body axis and an outer edge extending rearwardly from said leading edge toward the rear end of said impeller body and inwardly toward said impeller body axis, each of said blades defining a substantially helical path from said leading edge rearwardly along the length of the blade;

d) said helical path varying in pitch along one portion of said body and being substantially constant along another portion of said body; and e) said leading edge of each of said blades being swept back axially of said body from where the blade joins the impeller body to where it meets said outer edge of the corresponding blade.

5. The improvement in a rotary combine of claim 1 further characterized in that:

a) the pitch of each blade increases from about 400 mm/rev. at the front end of said body to about 940 mm/rev. at the rear end of said one portion.

* * * * *

UNITED STATES PATENT AND TRADEMARK OFFICE
CERTIFICATE OF CORRECTION

PATENT NO.    : 6,296,566 B1
DATED         : October 2, 2001
INVENTOR(S)   : Dale R. Tanis et al.

It is certified that error appears in the above-identified patent and that said Letters Patent is hereby corrected as shown below:

<u>Column 6,</u>
Line 1, delete "1" and substitute -- 4 -- in its place.
Line 3, after "said" insert -- rotor --.

Signed and Sealed this

Thirtieth Day of July, 2002

*Attest:*

*Attesting Officer*

JAMES E. ROGAN
*Director of the United States Patent and Trademark Office*